(12) United States Patent  
Goldman et al.

(10) Patent No.: US 8,887,938 B2  
(45) Date of Patent: *Nov. 18, 2014

(54) BUCKLING CLAMSHELL CONTAINER FOR AUTOMATED ALIQUOT AND DISPERSAL PROCESSES

(75) Inventors: Daniel M. Goldman, Des Moines, IA (US); Michael E. Hartman, Des Moines, IA (US); James L. Hunter, Littleton, CO (US); David L. Johnson, Johnston, IA (US); Griffiths J. Tucker, Davenport, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/476,880

(22) Filed: Jun. 2, 2009

(65) Prior Publication Data

US 2009/0283520 A1 Nov. 19, 2009

Related U.S. Application Data

(63) Continuation-in-part of application No. 11/774,256, filed on Jul. 6, 2007, now Pat. No. 7,938,284.

(60) Provisional application No. 60/806,660, filed on Jul. 6, 2006.

(51) Int. Cl.  
*B65D 43/16* (2006.01)

(52) U.S. Cl.  
USPC .......... 220/283; 220/281; 220/4.23; 220/819; 220/826

(58) Field of Classification Search  
USPC .............. 220/281, 4.22, 4.23, 819, 4.21, 818, 220/817, 826, 835, 839, 837, 810  
See application file for complete search history.

(56) References Cited

U.S. PATENT DOCUMENTS 2,379,090 A 6/1945 Le Beau ........................ 226/129  
2,729,885 A 1/1956 Wahl et al.

(Continued)

FOREIGN PATENT DOCUMENTS

AT 312 535 B 1/1974  
AT 494237 1/2011

(Continued)

OTHER PUBLICATIONS

Final Office Action from related U.S. Appl. No. 11/774,205, mailed Nov. 9, 2010.

(Continued)

*Primary Examiner* — Stephen Castellano  
(74) *Attorney, Agent, or Firm* — Pioneer Hi-Bred Int'l, Inc.

(57) ABSTRACT

A package assembly for automated aliquot and/or dispersal processes is provided. Embodiments of the present invention include, but are not limited to: first and second portions which cooperate to contain the aliquot, wherein a flexure channel is defined in each of opposite sides of at least one of the first or second portions, the flexure channels cooperating to define a flexure axis extending through the pair of flexure channels. Thus, embodiments of the present invention may allow at least one of first and second portions of the package assembly to flex about the flexure axis in response to an opening force exerted on the package assembly such that the first and second portions separate in response to the opening force.

23 Claims, 9 Drawing Sheets

(56) References Cited

U.S. PATENT DOCUMENTS

| | | | |
|---|---|---|---|
| 2,738,912 A | 3/1956 | Kieffaber | |
| 2,990,073 A | 6/1961 | Textor | 214/301 |
| 2,997,833 A | 8/1961 | Nigrelli | 53/382 |
| 2,999,607 A | 9/1961 | Tancredi | 214/304 |
| 3,105,903 A | 10/1963 | Sano | 250/66 |
| 3,443,720 A | 5/1969 | Al-Roy | |
| 3,853,235 A | 12/1974 | Lambert | 214/305 |
| 3,884,010 A | 5/1975 | Bardo | 53/3 |
| 3,908,824 A | 9/1975 | Takahara et al. | |
| 3,937,342 A | 2/1976 | Ittner | 214/304 |
| 4,036,380 A | 7/1977 | Berry | 214/305 |
| 4,243,141 A | 1/1981 | Takahashi | |
| 4,407,410 A | 10/1983 | Graetz et al. | |
| 4,412,616 A * | 11/1983 | Williams | 220/524 |
| 4,467,939 A * | 8/1984 | Warwick | 220/819 |
| 4,792,085 A | 12/1988 | Waring, III et al. | |
| 4,807,425 A | 2/1989 | Abrams | 53/468 |
| 4,843,801 A | 7/1989 | Roncero | 53/492 |
| 4,892,220 A | 1/1990 | Foos | |
| 5,221,040 A | 6/1993 | Sorenson | |
| 5,257,887 A | 11/1993 | Kregl | 414/411 |
| 5,332,147 A | 7/1994 | Sorenson | |
| 5,361,562 A | 11/1994 | Nagaoka et al. | |
| 5,388,082 A | 2/1995 | Chou | 368/327 |
| 5,388,758 A | 2/1995 | Scovell | |
| 5,645,164 A * | 7/1997 | Hocking | 206/209 |
| 5,646,712 A | 7/1997 | Solomon | 999/288 |
| 5,788,114 A | 8/1998 | Pereo | 221/110 |
| 5,792,653 A | 8/1998 | Weibezahn | 435/288.5 |
| 5,870,886 A | 2/1999 | Norton | 53/492 |
| 6,068,439 A | 5/2000 | Ohta | 414/411 |
| 6,123,237 A | 9/2000 | Lasserre | 222/402.21 |
| 6,129,237 A * | 10/2000 | Miyahara | 220/812 |
| 6,349,875 B1 | 2/2002 | Whitnell | |
| 6,474,500 B1 | 11/2002 | Carr et al. | |
| 6,536,194 B2 | 3/2003 | Minardi | 53/564 |
| 6,604,903 B2 | 8/2003 | Osborne | 414/411 |
| 6,706,989 B2 | 3/2004 | Hunter et al. | |
| 6,832,567 B2 | 12/2004 | Carr et al. | |
| 7,111,567 B2 | 9/2006 | Carr et al. | |
| 7,556,173 B2 * | 7/2009 | Solowiejko | 220/825 |
| 7,673,572 B2 | 3/2010 | Deppermann et al. | |
| 7,775,167 B2 | 8/2010 | Stehling et al. | |
| 7,938,284 B2 * | 5/2011 | Goldman et al. | 220/4.22 |
| 2004/0214313 A1 | 10/2004 | Zhang | 435/288.4 |
| 2006/0124643 A1 | 6/2006 | Markert et al. | |
| 2008/0006627 A1 | 1/2008 | Goldman | 220/4.22 |
| 2008/0009962 A1 | 1/2008 | Hood | 700/230 |
| 2009/0010750 A1 | 1/2009 | Goldman | 414/810 |
| 2010/0209221 A1 | 8/2010 | Goldman | 414/411 |

FOREIGN PATENT DOCUMENTS

| | | |
|---|---|---|
| AT | 553034 | 4/2012 |
| BR | PI 0721791 | 3/2013 |
| BR | PI 0714008 | 12/2013 |
| CA | 2656641 | 1/2008 |
| CA | 2690814 | 1/2009 |
| CH | 393 179 | 10/1965 |
| CL | 19872007 | 3/2008 |
| DE | 33 45 565 A1 | 6/1985 |
| DE | 44 19 475 A1 | 12/1995 |
| EP | 2038186 | 3/2009 |
| EP | 2167388 | 3/2010 |
| ES | 2 359 098 | 5/2011 |
| ES | 2 358 059 | 7/2012 |
| FR | 1 074 246 | 10/1954 |
| FR | 2 736 333 A1 | 1/1997 |
| GB | 20118 | 8/1913 |
| GB | 2 367 814 A | 4/2002 |
| MX | 2009000261 | 1/2009 |
| MX | 2009013362 | 1/2010 |
| WO | WO 93/25444 A1 | 12/1993 |
| WO | WO 2004/048200 A1 | 6/2004 |
| WO | WO 2005/077811 | 8/2005 |
| WO | WO 2008/006056 | 1/2008 |
| WO | WO 2008/006063 | 1/2008 |
| WO | WO 2009/008875 | 1/2009 |

OTHER PUBLICATIONS

International Search Report and Written Opinion for International Appl. No. PCT/US2007/072935, completed Oct. 30, 2007, mailed Nov. 12, 2007.
International Search Report and favorable Written Opinion for International Appl. No. PCT/US2007/072923, completed Mar. 17, 2008.
Office Action mailed Sep. 30, 2010, regarding U.S. Appl. No. 11/774,256.
U.S. Appl. No. 60/806,684, C. Fred Hood, filed Jul. 6, 2006.
U.S. Appl. No. 60/806,660, James L. Hunter, filed Jul. 6, 2006.
Preliminary Amendment filed Dec. 17, 2007 with the USPTO for U.S. Appl. No. 11/774,205 which was filed Jul. 6, 2007 [Applicant—Pioneer Hi-Bred International, Inc.; Inventor—Daniel M. Goldman;] [12 pages].
Restriction Requirement mailed Mar. 17, 2010 by the USPTO for U.S. Appl. No. 11/774,205 which was filed Jul. 6, 2007 [Applicant—Pioneer Hi-Bred International, Inc.; Inventor—Daniel M. Goldman;] [6 pages].
Response to Restriction Requirement filed Apr. 8, 2010 with the USPTO for U.S. Appl. No. 11/774,205 which was filed Jul. 6, 2007 [Applicant—Pioneer Hi-Bred International, Inc.; Inventor—Daniel M. Goldman;] [1 page].
Non-Final Office Action mailed May 12, 2010 by the USPTO for U.S. Appl. No. 11/774,205 which was filed Jul. 6, 2007 [Applicant—Pioneer Hi-Bred International, Inc.; Inventor—Daniel M. Goldman;] [12 pages].
Amendment filed Aug. 11, 2010 with the USPTO for U.S. Appl. No. 11/774,205 which was filed Jul. 6, 2007 [Applicant—Pioneer Hi-Bred International, Inc.; Inventor—Daniel M. Goldman;] [12 pages].
Amendment After Final filed Jan. 7, 2011 with the USPTO for U.S. Appl. No. 11/774,205 which was filed Jul. 6, 2007 [Applicant—Pioneer Hi-Bred International, Inc.; Inventor—Daniel M. Goldman.
Advisory Action mailed Jan. 28, 2011 by the USPTO for U.S. Appl. No. 11/774,205 which was filed Jul. 6, 2007 [Applicant—Pioneer Hi-Bred International, Inc.; Inventor—Daniel M. Goldman;] [4 pages].
Amendment filed Feb. 3, 2011 with the USPTO for U.S. Appl. No. 11/774,205 which was filed Jul. 6, 2007 [Applicant—Pioneer Hi-Bred International, Inc.; Inventor—Daniel M. Goldman;] [12 pages].
Non-Final Office Action mailed May 30, 2012 by the USPTO for U.S. Appl. No. 11/774,205 which was filed Jul. 6, 2007 [Applicant—Pioneer Hi-Bred International, Inc.; Inventor—Daniel M. Goldman;] [13 pages].
Amendment filed Aug. 29, 2012 with the USPTO for U.S. Appl. No. 11/774,205 which was filed Jul. 6, 2007 [Applicant—Pioneer Hi-Bred International, Inc.; Inventor—Daniel M. Goldman;] [14 pages].
Final Office Action mailed Dec. 21, 2012 by the USPTO for U.S. Appl. No. 11/774,205 which was filed Jul. 6, 2007 [Applicant—Pioneer Hi-Bred International, Inc.; Inventor—Daniel M. Goldman;] [14 pages].
Notice of Allowance mailed Aug. 20, 2013 by the USPTO for U.S. Appl. No. 11/774,205 which was filed Jul. 6, 2007 [Applicant—Pioneer Hi-Bred International, Inc.; Inventor—Daniel M. Goldman;] [8 pages].
Notice to File Corrected Application Papers mailed Sep. 18, 2013 by the USPTO for U.S. Appl. No. 11/774,205 which was filed Jul. 6, 2007 [Applicant—Pioneer Hi-Bred International, Inc.; Inventor—Daniel M. Goldman;] [3 pages].
Amendment filed Oct. 18, 2013 with the USPTO for U.S. Appl. No. 11/774,205 which was filed Jul. 6, 2007 [Applicant—Pioneer Hi-Bred International, Inc.; Inventor—Daniel M. Goldman;] [8 pages].
Notice of Allowance mailed Dec. 4, 2013 by the USPTO for U.S. Appl. No. 11/774,205 which was filed Jul. 6, 2007 [Applicant—Pioneer Hi-Bred International, Inc.; Inventor—Daniel M. Goldman;] [9 pages].

(56) References Cited

OTHER PUBLICATIONS

Preliminary Amendment filed Set. 14, 2007 with the USPTO for U.S. Appl. No. 11/774,256 which was filed Jul. 6, 2007 [Applicant—Pioneer Hi-Bred International, Inc.; Inventor—Daniel M. Goldman;] [11 pages].
Non-Final Office Action mailed Nov. 9, 2010 by the USPTO for U.S. Appl. No. 11/774,256 which was filed Jul. 6, 2007 [Applicant—Pioneer Hi-Bred International, Inc.; Inventor—Daniel M. Goldman;] [16 pages].
Amendment filed Dec. 10, 2010 with the USPTO for U.S. Appl. No. 11/774,256 which was filed Jul. 6, 2007 [Applicant—Pioneer Hi-Bred International, Inc.; Inventor—Daniel M. Goldman;] [12 pages].
Notice of Allowance mailed Feb. 14, 2011 by the USPTO for U.S. Appl. No. 11/774,256 which was filed Jul. 6, 2007 [Applicant—Pioneer Hi-Bred International, Inc.; Inventor—Daniel M. Goldman;] [8 pages].
Issue Notification mailed Apr. 20, 2011 by the USPTO for U.S. Appl. No. 11/774,256 which was filed Jul. 6, 2007 [Applicant—Pioneer Hi-Bred International, Inc.; Inventor—Daniel M. Goldman;] [1 page].
Non-Final Office Action mailed Feb. 17, 2012 by the USPTO for U.S. Appl. No. 12/769,426 which was filed Apr. 28, 2010 [Applicant—Pioneer Hi-Bred International, Inc.; Inventor—Daniel M. Goldman;] [9 pages].
Amendment filed Jun. 15, 2012 with the USPTO for U.S. Appl. No. 12/769,426 which was filed Apr. 28, 2010 [Applicant—Pioneer Hi-Bred International, Inc.; Inventor—Daniel M. Goldman;] [10 pages].
Final Office Action mailed Oct. 12, 2012 by the USPTO for U.S. Appl. No. 12/769,426 which was filed Apr. 28, 2010 [Applicant—Pioneer Hi-Bred International, Inc.; Inventor—Daniel M. Goldman;] [12 pages].
Amendment After Final filed Jan. 11, 2013 with the USPTO for U.S. Appl. No. 12/769,426 which was filed Apr. 28, 2010 [Applicant—Pioneer Hi-Bred International, Inc.; Inventor—Daniel M. Goldman;] [8 pages].
Advisory Action mailed Feb. 28, 2013 by the USPTO for U.S. Appl. No. 12/769,426 which was filed Apr. 28, 2010 [Applicant—Pioneer Hi-Bred International, Inc.; Inventor—Daniel M. Goldman;] [3 pages].
Amendment filed Mar. 26, 2013 with the USPTO for U.S. Appl. No. 12/769,426 which was filed Apr. 28, 2010 [Applicant—Pioneer Hi-Bred International, Inc.; Inventor—Daniel M. Goldman;] [8 pages].
Non-Final Office Action mailed Aug. 19, 2013 by the USPTO for U.S. Appl. No. 12/769,426 which was filed Apr. 28, 2010 [Applicant—Pioneer Hi-Bred International, Inc.; Inventor—Daniel M. Goldman;] [10 pages].
Amendment and Response to Non-Final Office Action filed Nov. 19, 2013 with the USPTO for U.S. Appl. No. 12/769,426 which was filed Apr. 28, 2010 [Applicant—Pioneer Hi-Bred International, Inc.; Inventor—Daniel M. Goldman;] [11 pages].
Notice of Allowance mailed Feb. 5, 2014 by the USPTO for U.S. Appl. No. 12/769,426 which was filed Apr. 28, 2010 [Applicant—Pioneer Hi-Bred International, Inc.; Inventor—Daniel M. Goldman;] [9 pages].
International Preliminary Report on Patentability mailed Jan. 12, 2010 by the International Bureau for PCT/US2007/072923 which was filed Jul. 6, 2007 and published as WO 2009/008875 [Applicant—Pioneer Hi-Bred International, Inc.; Inventor—Daniel M. Goldman;] [5 pages].
International Preliminary Report on Patentability mailed Jan. 16, 2009 by the International Bureau for PCT/US2007/072925 which was filed Jul. 6, 2007 and published as WO 2008/006056 [Applicant—Pioneer Hi-Bred International, Inc.; Inventor—Daniel M. Goldman;] [8 pages].

* cited by examiner

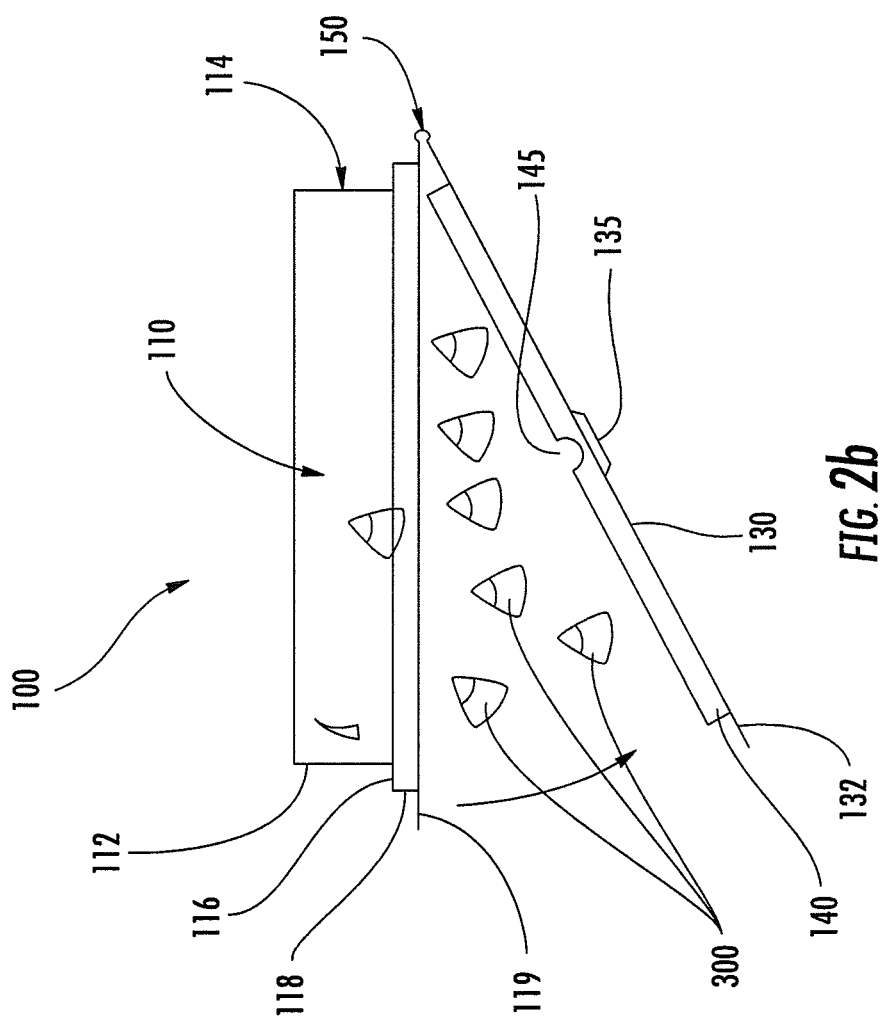

BUCKLING CLAMSHELL CONTAINER FOR AUTOMATED ALIQUOT AND DISPERSAL PROCESSES

CROSS-REFERENCE TO RELATED APPLICATIONS

This application is a continuation-in-part of U.S. patent application Ser. No. 11/774,256, filed Jul. 6, 2007, which claims priority from U.S. Provisional Application No. 60/806,660, filed Jul. 6, 2006, now U.S. Pat. No. 7,938,284, both of which are hereby incorporated herein in their entirety by reference.

FIELD OF THE INVENTION

The present invention relates generally to containers for receiving, containing, and selectively dispensing a plurality of objects via automated processes. More specifically, the present invention provides a partially flexible buckling clamshell container for receiving metered seed sample aliquots. The container of the present invention may be selectively opened by automated processes by elastically deforming at a predetermined point to release one or more objects contained therein when the container is inverted and subjected to an opening force.

BACKGROUND OF THE INVENTION

A number of packaging containers have been developed for holding and sealing products and/or individual parts or components. For example, conventional vacuum molded or thermoformed plastic containers (such as those produced to package small hardware components such as screws and/or nails) often include a container body defining an aperture and an attached lid that is designed to selectively close the aperture. For example, some conventional packaging containers further include corresponding flange portions (extending from the container body and the lid, respectively) that are designed to fit snugly against one another so as to seal the container body. Some conventional packaging containers further include an adhesive material disposed between flange portions for sealing the lid closed about the aperture defined by the container body.

Such conventional containers are often well-suited for providing a robust package that may provide adequate protection to the product contained therein. However, once closed and sealed, such conventional packages are not well suited for re-opening, much less re-opening by automated processes. Thus, conventional containers such as the type described generally above may not be well-suited to serve as an aliquot container for receiving, selectively holding, and selectively dispensing one or more particles or components as part of an intermediate research and/or manufacturing step. For example, manual dexterity and/or the use of a cutting tool, may be required to open and remove products from many conventional packaging containers (especially those that include corresponding flange portions and adhesives disposed therebetween). In addition, such containers are not well suited for re-opening (after being closed) by simple automated processes (such as the application of a compressive force on the container) because of the constant interference fit between the lids and reservoirs of conventional packaging containers.

Thus in order to facilitate the selective capture, retention, and dispensing of particulate components by simple automated and/or manual processes, there is a need in the art for a packaging container that not only allows for the quick and complete capture and retention of particulate components, but also a container that may be quickly and easily re-opened so as to selectively dispense the particulate components held therein upon the application of a simple automated and/or manual opening force to the container. For example, there exists a need in the art for an easily-opened clamshell container for segregating and selectively dispensing an aliquot of a particular seed type using mainly automated processes. Furthermore, there exists a need for a packaging container that is not only easily closed and re-opened as described above, but that is easily and economically manufactured and provided with a lid and reservoir portion that are provided in a one-piece assembly such that the lid may remain connected to the reservoir portion of the container even as the container is selectively opened to disperse the particulate components held therein.

SUMMARY OF VARIOUS EMBODIMENTS

The present invention addresses the above needs and achieves other advantages by providing various embodiments of a package assembly for selectively containing and releasing a particulate aliquot. In one embodiment, the package assembly generally comprises first and second portions which cooperate to contain the aliquot, at least one of the first or second portions defining a pair of opposite sides and having a flexure channel defined in each of the opposite sides, wherein the flexure channels define a flexure axis extending through the flexure channels, and wherein the package assembly is configured such that upon application of an opening force, one of the first or second portions flexes outwardly about the flexure axis so that the first and second portions separate, thus releasing the particulate aliquot. Some embodiments may further comprise at least one concave portion located on a flange portion defined by at least one of the first or second portions, the concave portion defining an aperture configured to receive an opening tool for encouraging the first and second portions to separate. Some embodiments may further comprise at least one corresponding concave portion located on a second flange portion of the package assembly and adapted, upon closing the package assembly, to substantially align with the other concave portion to define an aperture configured to receive an opening tool for encouraging the first and second portions to separate.

In some embodiments, the first and second portions may define first and second flange portions, respectively, and the package assembly may further comprise a notch portion located on one of the first or second flange portions, the notch portion configured to allow a disengaging tool to apply a substantially normal force against the other of the first or second flanges, for encouraging the first and second portions to separate. In some embodiments, the first and second portions may be held together in a closed position through an interference fit. In some embodiments, each of the flexure channels may define a cross-sectional shape selected from the group consisting of an open rectangular shape, an open oval shape, a half-circular shape, generally U-shaped, generally V-shaped, and combinations thereof. In some embodiments, one flexure channel may define a cross-sectional shape that is different than the other flexure channel. In some embodiments, the package assembly may be formed using a process selected from the group consisting of thermoforming, vacuum forming, blow molding, injection molding, casting, and combinations thereof. In some embodiments, the package assembly may comprise materials selected from the group consisting of polyethylene terephthalate, polyvinyl chloride, polypropylene, polyester, polylactic acid, high-density polyethylene, low-density polyethylene, and combinations thereof. Some embodiments may further comprise one or more stiffening features located on at least one of the first and second portions, wherein the stiffening features may be configured to minimize bulging between the first and second portions or to maintain engagement of the first and second portions.

In another embodiment, the present invention provides a package assembly for selectively containing and releasing a particulate aliquot that generally comprises a container portion defining an opening, a cover portion including at least two opposite sides and configured to cooperate with the container portion to selectively close the opening defined by the container portion, and a reinforcing ridge portion disposed proximate a perimeter of the cover portion and configured to be capable of engaging an inner periphery of the opening, in an interference fit therewith, so as to selectively close the opening, the reinforcing ridge portion defining a flexure channel on each of the opposite sides of the cover portion, the flexure channels defining a flexure axis extending substantially perpendicularly to the opposite sides of the cover portion, the cover portion being configured such that when an opening force is applied to package assembly, the cover portion flexes outwardly from the container portion about the flexure axis and thereby disengages the reinforcing ridge portion from the inner periphery of the opening so that the cover portion disengages from the container portion, thus releasing the particulate aliquot.

Some embodiments may further comprise a hinge portion located between an edge of the cover portion and the container portion. Some embodiments may further comprise a shelf portion including a flange extending substantially perpendicular from an outer periphery of the opening and a wall portion extending substantially perpendicular from the flange and wherein the reinforcing ridge is configured to operably engage the shelf portion so as to selectively close the opening defined by the container portion. Some embodiments may further comprise a first flange portion extending substantially perpendicular from an outer periphery of the opening, and a second flange portion extending substantially outward from the reinforcing ridge such that upon closing the package assembly, the cover portion closes the opening defined by the container portion and the first flange portion is substantially adjacent and parallel to the second flange portion. In some embodiments, the first and second flange portions may each define concave portions such that upon closing the package assembly the concave portions substantially align and define an aperture between the first and second flange portions, the aperture being configured to receive an opening tool for encouraging the cover portion to flex outwardly from the container portion about the flexure axis so that the cover portion disengages from the container portion.

In some embodiments, at least one of the flexure channels may define a cross-sectional shape selected from the group consisting of an open rectangular shape, an open oval shape, a half-circular shape, generally U-shaped, generally V-shaped, and combinations thereof. In some embodiments, one flexure channel may define an open rectangular cross-sectional shape and the other flexure channel defines a generally V-shaped cross-sectional shape. In some embodiments, the container portion, the cover portion, the reinforcing ridge portion, and the opening defined by the container portion may be substantially rectangular. In some embodiments, the container portion, the cover portion, the reinforcing ridge portion, and the hinge portion may be integrally formed as a substantially unitary assembly. Some embodiments may further comprise at least one notch portion defined by the first flange portion, the at least one notch portion being adapted to allow a portion of a disengaging tool to pass therethrough for encouraging the cover portion to disengage from the container portion. Some embodiments may further comprise one or more stiffening features located on the cover portion, wherein the stiffening features may be configured to minimize bulging between the cover and container portions or to maintain engagement of the cover and container portions. In some embodiments, the stiffening features may include a pair of elongate stiffening ribs disposed on the cover portion. Some embodiments may further comprise a beveled cover portion end disposed along an inner surface of the reinforcing ridge portion opposite the hinge portion.

BRIEF DESCRIPTION OF THE DRAWINGS

Figure 1:
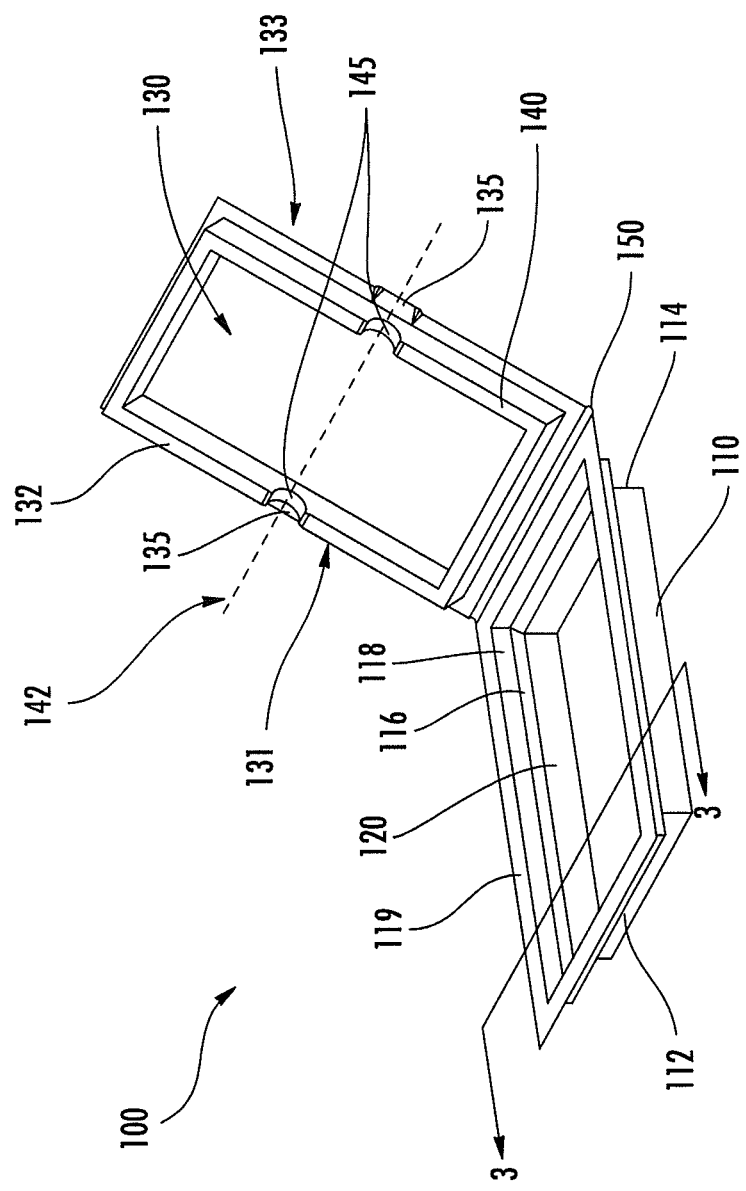
Figure 2A:
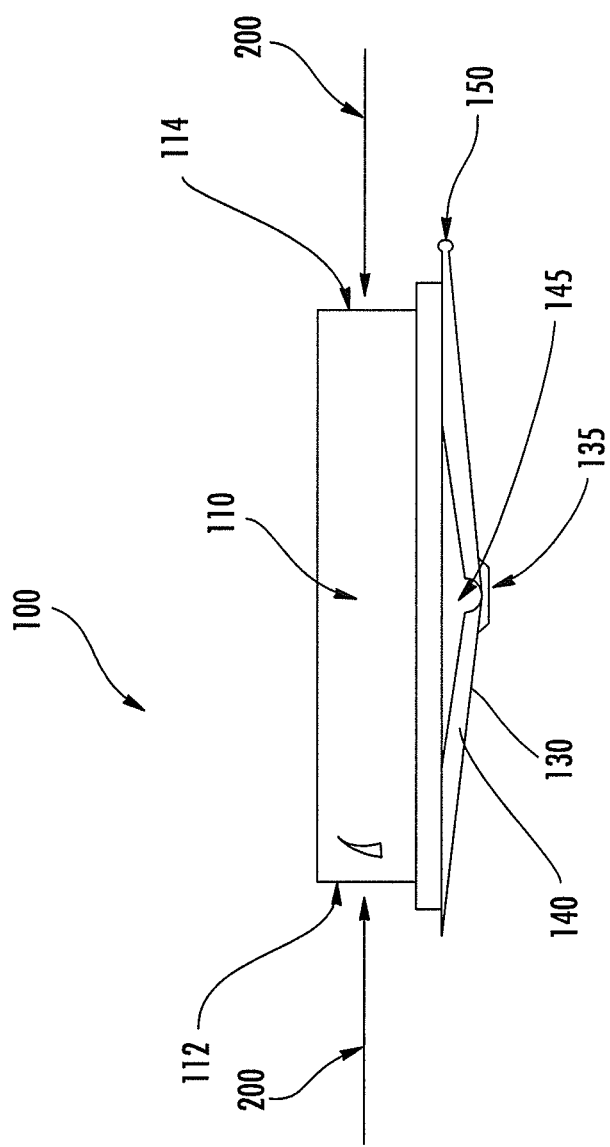
Figure 3:
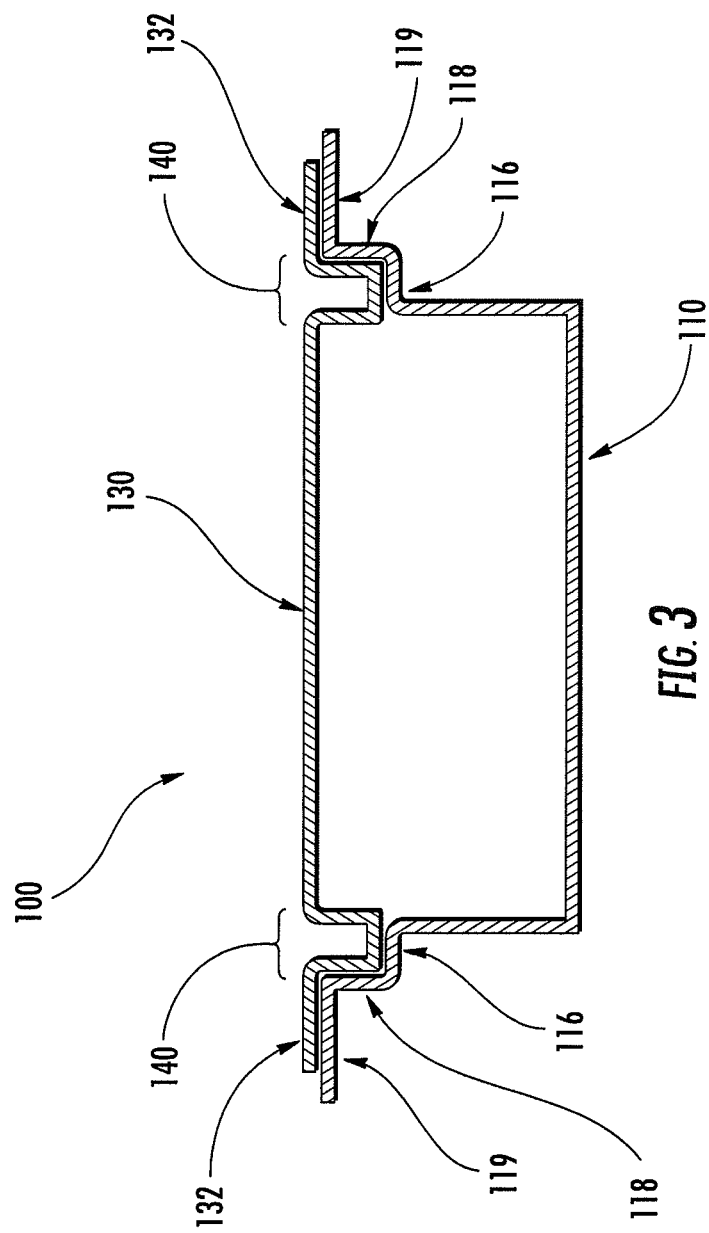
Figure 4:
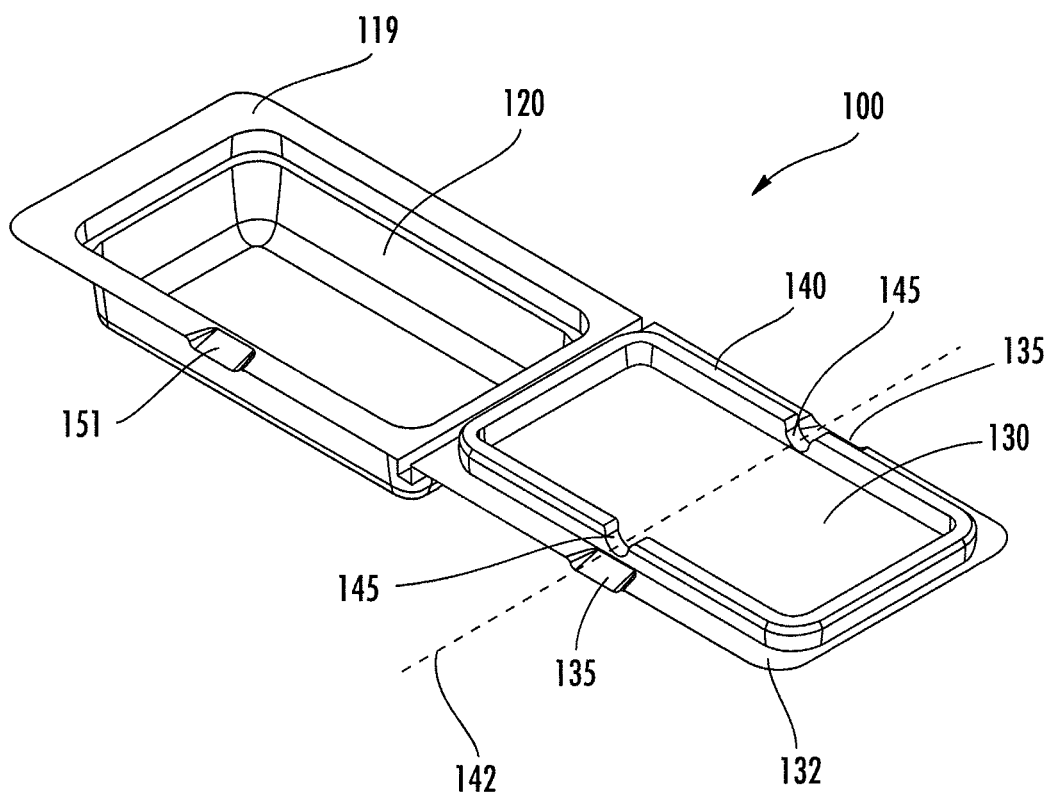
Figure 5:
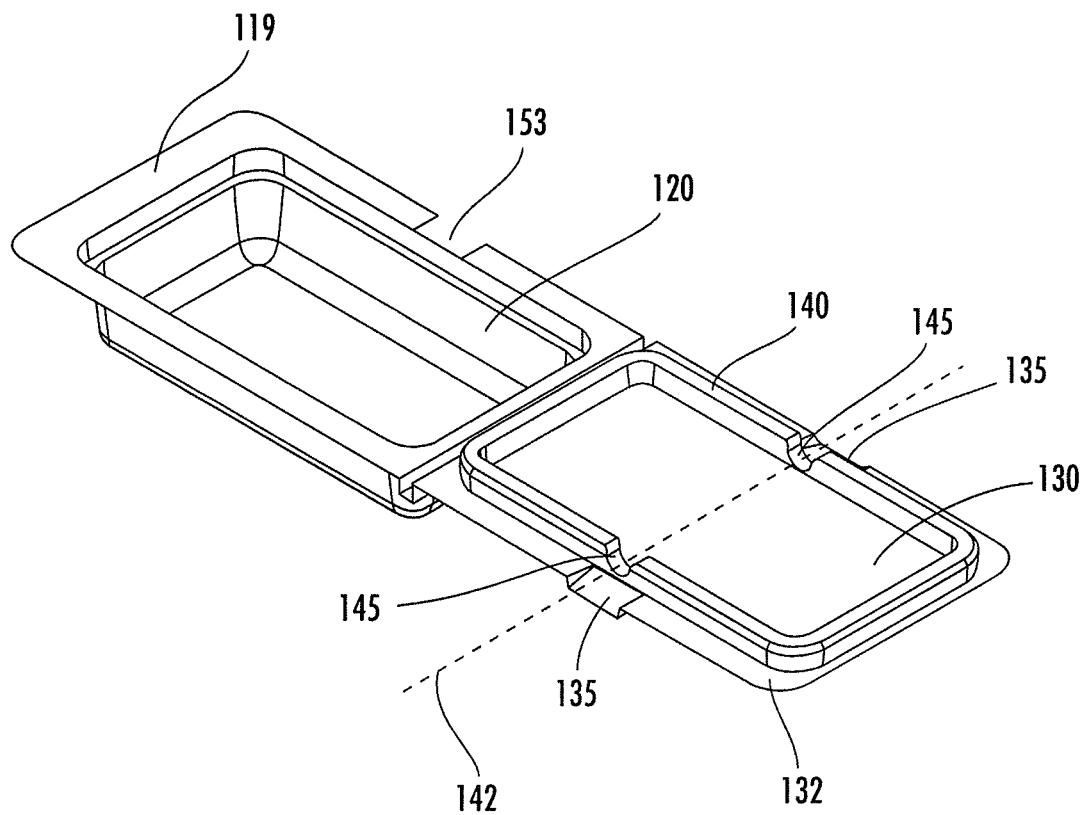
Figure 6:
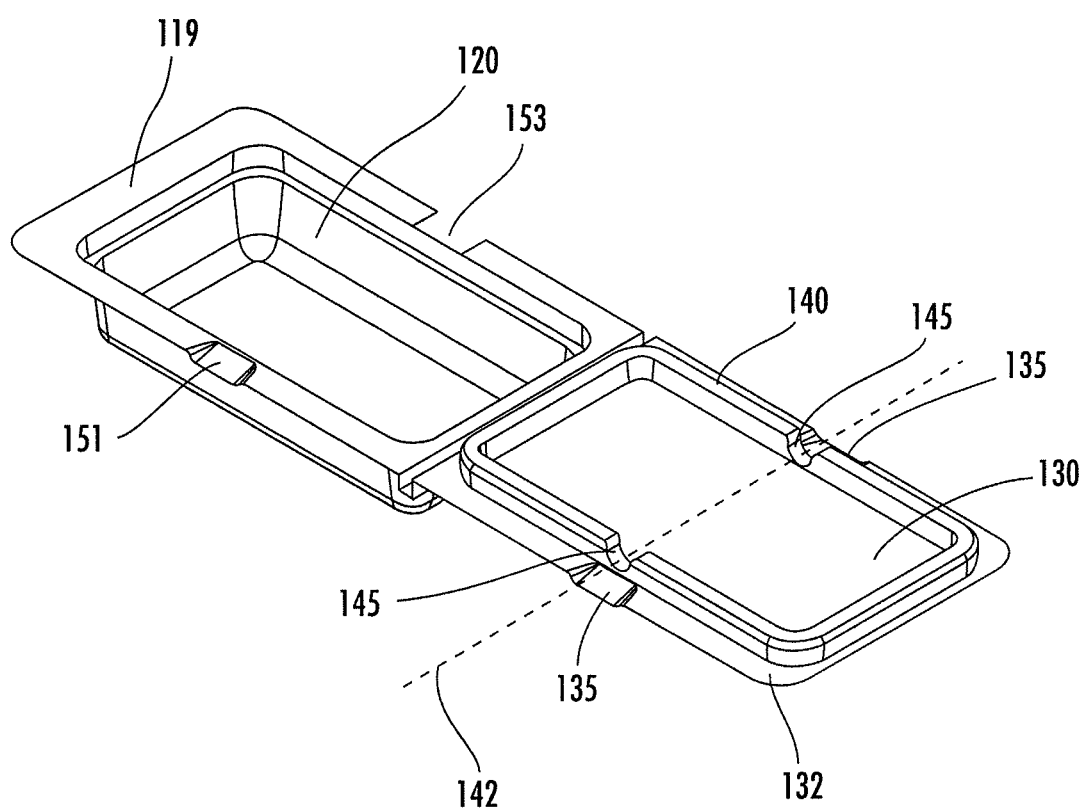
Figure 7:
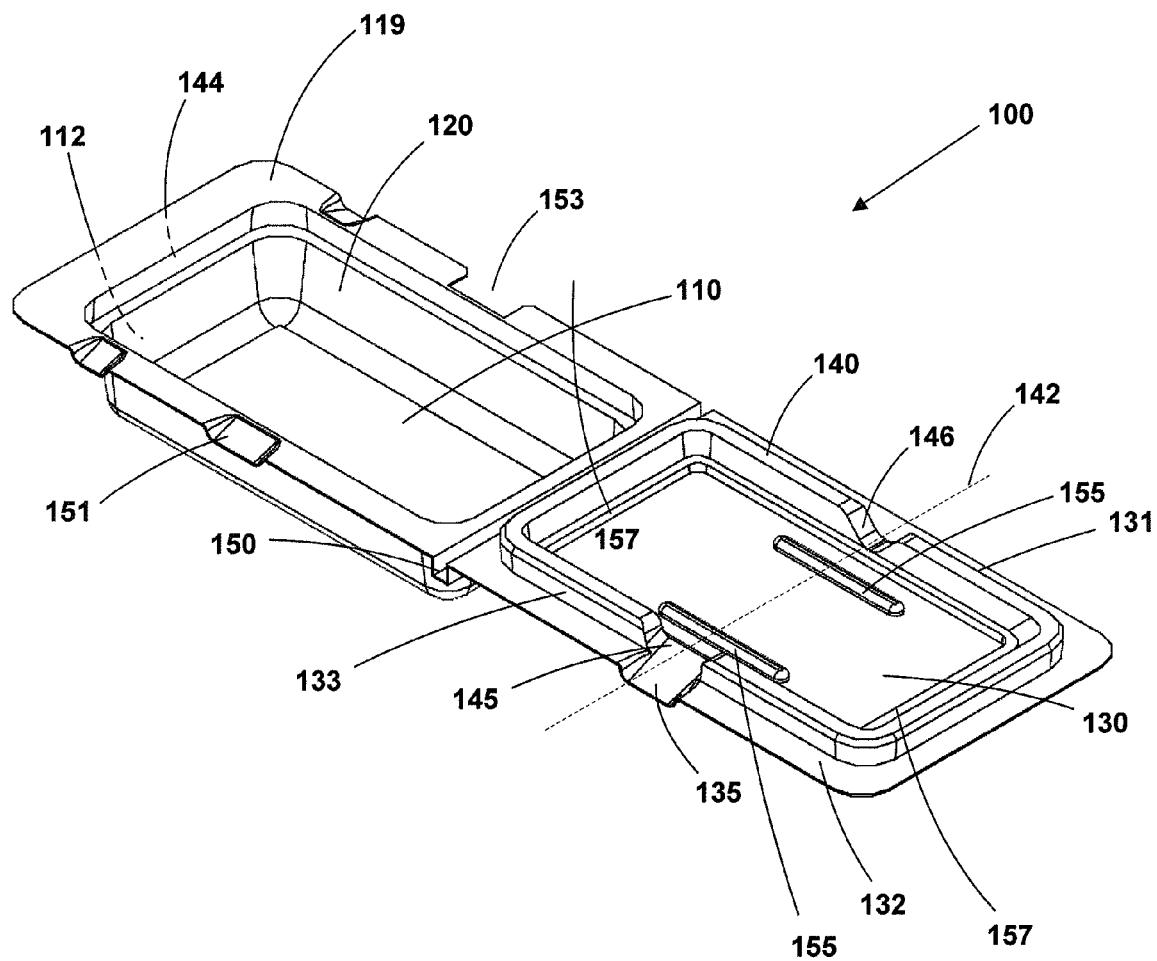
Figure 8:
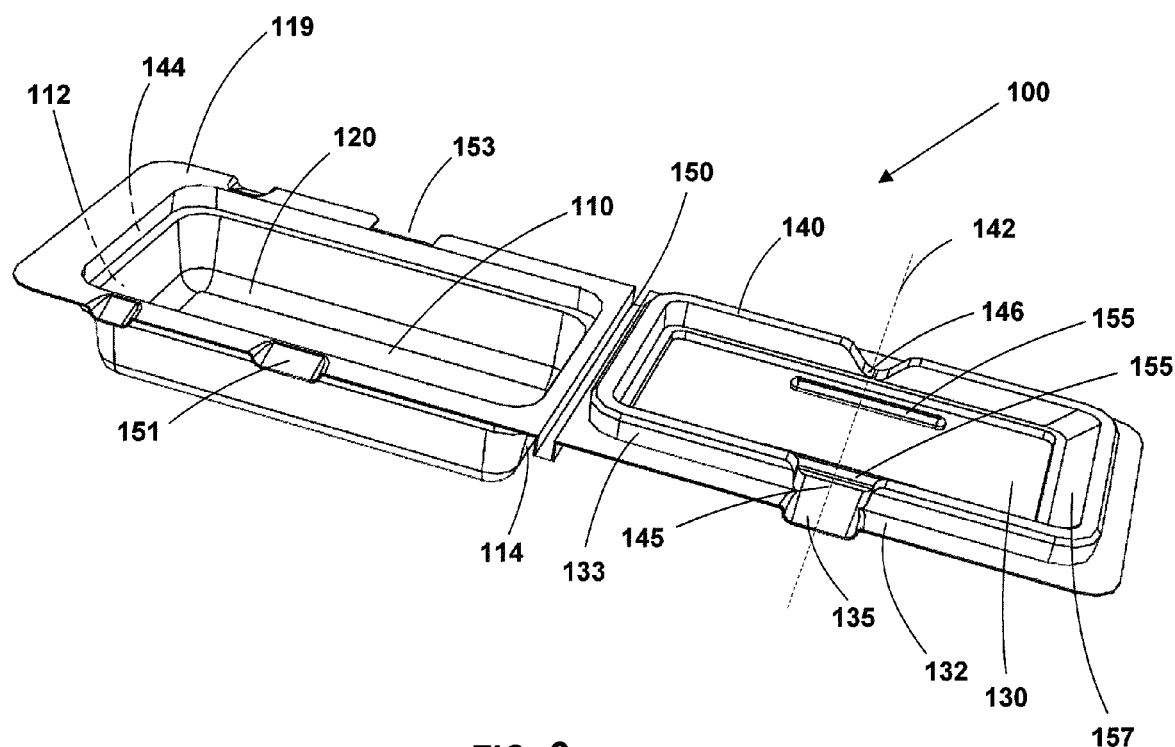

Having thus described the invention in general terms, reference will now be made to the accompanying drawings, which are not necessarily drawn to scale, and wherein:

FIG. 1 shows a perspective view of a package assembly according to one embodiment of the present invention;

FIG. 2a shows a side view of a package assembly according to one embodiment of the present invention including an exemplary flexing action of the cover portion of the package assembly in response to an opening force;

FIG. 2b shows a side view of a package assembly according to one embodiment of the present invention including disengagement of the cover portion from the container portion after the application of an opening force; and FIG. 3 shows a cross-sectional view of a package assembly according to one embodiment of the present invention showing, for example, the shelf portion, first flange portion, and second flange portion;

FIG. 4 shows a perspective view of a package assembly according to another embodiment of the present invention that includes a corresponding concave portion defined by the first flange portion;

FIG. 5 shows a perspective view of a package assembly according to another embodiment of the present invention that includes a notch portion defined by the first flange portion;

FIG. 6 shows a perspective view of a package assembly according to another embodiment of the present invention that includes both a corresponding concave portion and a notch portion defined by the first flange portion;

FIG. 7 shows a perspective view of a package assembly according to yet another embodiment of the present invention that includes dissimilar flexure channels; and FIG. 8 shows a perspective view of the package assembly of FIG. 7 from a slightly different angle.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

While the embodiments of the present invention are described below in the context of an agricultural research environment wherein the package assembly may be used to receive, contain, segregate, and selectively dispense seed aliquots containing seeds of a particular type (such as, for example, seeds corresponding to a selected corn plant hybrid or genetically modified organism (GMO)), it should be understood that the package assembly embodiments of the present invention may also serve as a closable package assembly that is configured to be capable of being opened via a simple application of linear compressive forces. For example, in some embodiments, the package assembly 100 of the present invention may be used to contain components in a "parts kit" in a manufacturing environment such that the components may be closed and contained within package assembly and thereafter be easily removed from the package assembly by simple manual and/or automated steps. In addition, one skilled in the art will appreciate that the package assembly of the present invention may be used for holding and selectively dispensing a variety of particles, components, powders, fluids, foods, and/or other items that may require temporary containment and/or segregation prior to being utilized for a downstream process. Embodiments of the present invention may thus be useful for segregating, containing, and selectively dispensing such items when required. An example of a particulate preparation process is disclosed in U.S. patent application Ser. No. 11/774,230, entitled "System, Method, and Computer Program Product for Automated High-Throughput Seed Sample Aliquot Preparation, Treatment, and Dispersal," which claims priority from U.S. Provisional Application No. 60/806,684, also entitled "System, Method, and Computer Program Product for Automated High-Throughput Seed Sample Aliquot Preparation, Treatment, and Dispersal," both of which are hereby incorporated by reference herein in their entirety. An example of a method of handling a particulate container is disclosed in U.S. patent application Ser. No. 11/774,205, entitled "Method of Handling Clamshell Containers Containing a Particulate Aliquot," which is also hereby incorporated by reference herein in its entirety.

A package assembly in accordance with the present invention comprises first and second portions that cooperate to contain a particulate aliquot. FIG. 1 shows a perspective view of a package assembly 100 according to one embodiment of the present invention. As shown, the package assembly 100 of the depicted embodiment may generally comprise a container portion 110 defining an opening 120 and including at least two opposite sides 112, 114. The package assembly 100 may further comprise a cover portion 130 configured to cooperate with the container portion 110 to selectively close the opening 120 defined by the container portion 110.

Furthermore, in order to effectively close the opening 120 defined by the container portion 110, the cover portion 130 may comprise a reinforcing ridge portion 140 disposed proximate a perimeter of the cover portion 130 and configured to be capable of engaging an inner periphery of the opening 120, in an interference fit, so as to selectively close the opening 120, such that the cover portion 130 is not easily disengaged from the container portion 110 without the application of an opening force, as described herein. Furthermore, the reinforcing ridge portion 140 may also define a pair of flexure channels 145 on opposite sides 131, 133 of the cover portion 130. Furthermore, the flexure channels 145 may cooperate to define a flexure axis 142 extending substantially perpendicularly to the opposite sides 131, 133 of the cover portion 130 that define the flexure channels 145 such that the flexure axis 142 is substantially parallel to the opposite sides 112, 114 of the container portion 110. It should be noted that in various embodiments, only a portion of the cover portion 130 and the container portion 110 may cooperate to hold the portions in a closed position. Moreover, an interference fit need not be required to hold the cover portion 130 in a closed position over the opening 120 of the container portion 110. Package assemblies of various embodiments of the present invention may be configured so that at least one of first or second portions flex outwardly about a flexure axis in response to an opening force. In such a manner, the first and second portions may separate, at least partially, in response to the opening force, thus releasing at least a portion of a particulate aliquot contained within the package assembly. Thus, for example, package assemblies of other embodiments may comprise independent first and second portions. Additionally, an adhesive or heat sealing material may be used to hold the first and second portions (or a portion of the first and second portions) in a closed position, wherein the adhesive or sealing material is designed to fail when the package assembly is subjected to an opening force.

According to various embodiments of the present invention, the container portion 110, the cover portion 130, and the opening 120 defined by the container portion may be formed into a variety of different shapes. For example, in some embodiments, as shown generally in FIGS. 1-3, the various components of the package assembly may be formed in a substantially rectangular shape. In other embodiments the various components (such as the container portion 110, cover portion 130, and reinforcing ridge portion 140) may be formed to have a variety of other shapes, including but not limited to: polygonal shapes (including, but not limited to rectangles, triangles, hexagons); circular; oval; semi-circular; and combinations of such shapes.

As shown in FIG. 2a, the flexure channels 145 defined in the reinforcing ridge portion 140 of the cover portion 130 may have a substantially half-circular cross section. According to other embodiments, the flexure channels 145 may also define various other cross-sectional shapes that may be tailored to define a flexure axis 142 (see FIG. 1, for example) extending substantially perpendicularly to the opposing sides 131, 133 of the cover portion 130. For example, a flexure channel may, in some alternative embodiments, define a cross-sectional shape that may include, but is not limited to: an open rectangular shape; an open oval shape; a half-circular shape; generally U-shaped; generally V-shaped; and combinations of such cross-sectional shapes. The shape of the cross-section of the flexure channels 145 may thus be tailored to suit the material used to form the cover portion 130 and/or the reinforcing ridge portion 140 so as to define a distinct flexure axis 142 across a width of the cover portion 130 such that the cover portion flexes outwardly from the container portion 110 about the flexure axis 142 defined by the opposing flexure channels 145.

Thus, as shown generally in FIG. 2a, the cover portion 130 may be configured to flex outwardly from the container portion 110 about the flexure axis 142 (see FIG. 1), when an opening force is applied to the package assembly 100. In the depicted embodiment, the opening force comprises a compressive force 200 applied to opposite sides 112, 114 of the container portion 110. However, in the depicted embodiment and in various other embodiments, an opening force may comprise any force applied to the package assembly 100 configured such that a first or second portion of the package assembly 100 flexes outwardly about a flexure axis so that the portions separate. In the depicted embodiment, the compressive force 200 initiates disengagement of the reinforcing ridge portion 140 from the inner periphery of the opening 120 so that the cover portion 130 disengages from the container portion 110. As shown generally in FIGS. 2a and 2b, the package assembly 100 of the present invention may, in some exemplary embodiments, be inverted such that the cover portion 130 may drop away from the container portion 110 after the reinforcing ridge portion 140 has been disengaged from the inner periphery of the opening 120 (due, for example, to a compressive force 200 applied to the opposite sides 112, 114 of the container portion 100 as shown generally in FIG. 2a). As shown generally in FIG. 2b, the package assembly 100 may thus be used to disperse a plurality of particles 300 (such as a seed sample aliquot) that have been segregated and contained within the container portion 110 of the package assembly 100 of the present invention. As described generally above, the package assembly 100 of the embodiment depicted in FIG. 2a of the present invention may be advantageously opened by the simple application of a compressive force 200 on the opposite sides 112, 114 of the container portion 110 of the package assembly 100 while suspending the package assembly 100 in an inverted position (as shown generally in FIG. 2a). It should be noted that in other embodiments, the application of a compressive force may comprise applying a force to one of opposing sides 112, 114 while the other side is supported, so as to effect a compressive force on the package assembly 100.

According to some other embodiments, the package assembly 100 may be positioned in a substantially upright position (i.e. with the cover portion 130 positioned above the container portion 110) during the application of a compressive force 200 to the opposing sides 112, 114 of the container portion. As described generally above, the cover portion 130 may thus flex outwardly from the container portion 110 about the flexure axis 142 and disengage from the interference fit with an inner periphery of the opening 120 defined in the container portion 110. In such embodiments, a hinge portion 150 (as discussed further below) disposed between the container portion 110 and the cover portion 130 may be biased to expand so as to urge the cover portion 130 away from the container portion 110 once the reinforcing ridge portion 140 of the cover portion 130 has been initially disengaged from the container portion 110 by the application of the compressive force 200.

As shown generally in FIGS. 2a and 2b, the package assembly 100 may further comprise a hinge portion 150 located between an edge of the cover portion 130 and one of the at least two opposite sides 112, 114 of the container portion 110 such that the cover portion 130 and the container portion 110 may form a substantially unitary package assembly 100 even when the cover portion 130 (and the reinforcing ridge portion 140 extending therefrom) is disengaged from the inner periphery of the opening 120 defined in the container portion 110 (as shown generally in FIG. 2b). In some embodiments of the present invention, the hinge portion 150 may be integrally formed with one or both of the container portion 110 and the cover portion 130 to form a unitary package assembly 100. According to some alternative embodiments, the hinge portion 150 may also be operably engaged with one or both of the container portion 110 and the cover portion 130 using an adhesive material in order to form the package assembly 100 (such as that shown, for example, in FIG. 1). As described generally above, the hinge portion 150 may be formed with a bias towards the "open" position (as shown generally in FIG. 2b) such that the hinge portion 150 may urge the cover portion 130 generally away from the container portion 110 once the compressive force 200 has caused the initial disengagement of the reinforcing ridge portion 140 from an inner periphery of the opening 120 defined in the container portion 110.

In some additional embodiments of the present invention, as shown generally in FIG. 1 and FIG. 3, the package assembly 100 may further comprise a shelf portion including a flange 116 extending substantially perpendicular from an outer periphery of the opening 120 and a wall portion 118 extending substantially perpendicular from the flange 116. The shelf portion defined by the flange 116 and wall portion 118 may thus provide a seating area for the reinforcing ridge portion 140 of the cover portion 130 as the cover portion 130 is engaged with the container portion 110 to close the opening 120 defined therein. For example, as shown in the exemplary cross-sectional view of one embodiment of the package assembly in FIG. 3, the reinforcing ridge 140 may be configured to engage the shelf portion (comprising the flange 116 and wall portion 118, for example) so as to selectively close the opening 120 defined in the container portion. Thus, the shelf portion defined by the flange 116 and wall portion 118 may, in some embodiments, prevent the cover portion 130 from encroaching upon the volume of the container portion 110 and potentially damaging and/or crushing the plurality of particles 300 (such as a seed sample aliquot) contained therein.

Furthermore, as shown generally in FIGS. 1 and 3, the package assembly 100 may also comprise a pair of complementary flange portions 119, 132 extending outward from an outer periphery of the opening 120 and the reinforcing ridge portion 140 of the cover portion 130, respectively. For example, as shown in FIG. 3, the package assembly 100 may further comprise a first flange portion 119 extending substantially perpendicular from at outer periphery of the opening 120 (which may, in some embodiments, be defined by an edge of the wall portion 118 of the shelf portion), and a second flange portion 132 extending substantially outward from the reinforcing ridge 140 such that when the cover portion 130 closes the opening 120 defined by the container portion 110, the first flange portion 119 is substantially adjacent and parallel to the second flange portion 132. Furthermore, as shown generally in FIGS. 1 and 2a, the second flange portion 132 may define a pair of opposite concave portions 135 substantially coaxial with the flexure axis 142. According to such embodiments, the pair of opposite concave portions 135 may form a corresponding pair of apertures between the first and second flange portions 119, 132 when the cover portion 130 closes the opening 120 defined by the container portion 110. For example, in some such embodiments, the pair of apertures defined by the opposite concave portions 135 formed in the second flange portion 132 may be adapted to be capable of receiving one or more opening tools for encouraging the cover portion 130 to flex outwardly from the container portion 110 about the flexure axis 142 (see generally FIG. 2a) so that the cover portion 130 disengages from the container portion 110. Thus, such opposite concave portions 135 defined by the second flange portion 132 may serve to define a corresponding pair of apertures between the flange portions 119, 132 so that one or more opening tools (such as, for example, a screwdriver, knife, or other narrow-bladed implement) and/or a fingertip may be inserted into the aperture located at or near the flexure axis 142 so as to urge the cover portion 130 out of its interference fit with the container portion 110. One skilled in the art will also appreciate that the apertures defined by the opposite concave portions 135 defined by the second flange portion 132 may also define a corresponding pair of apertures for receiving one or more opening tools that, in some embodiments, may act alone to create the opening force, or, in other embodiments, may serve to accompany the application of another opening force, such as, for example, the compressive force 200 (see FIG. 2a) in order to urge the cover portion 130 outwardly from the container portion 110 about the flexure axis 142. The compressive force 200 and/or the application of one or more opening tools at the location of the opposing ridges 135 may thus disengage the reinforcing ridge portion 140 from the inner periphery of the opening 120 so that the cover portion 130 disengages from the container portion 110. It should be noted that in other embodiments, one or more concave portions may be located anywhere on the package assembly wherein the concave portion(s) are configured to receive an opening tool for encouraging the first and second portions to separate.

FIG. 4 shows another exemplary embodiment of a package assembly 100 similar to that shown and described with respect to FIGS. 1-3. As above, the package assembly 100 includes a pair of opposite concave portions 135 defined by the second flange portion 132 of the cover portion 130, however the depicted embodiment also includes at least one corresponding concave portion 151 defined by the first flange portion 119. The corresponding concave portion 151 is configured such that when the cover portion 130 is engaged with the container portion 110, the corresponding concave portion 151 substantially aligns with one of the opposite concave portions 135 defined by the second flange portion 132. In such a manner, the aligned corresponding concave portion 151 and concave portion 135 form a larger aperture between the first and second flange portions 119, 132 when the cover portion 130 closes the opening 120 defined by the container portion 110. As a result, the aperture formed by the corresponding concave portion 151 and the concave portion 135 creates a larger target for receiving an opening tool for encouraging the cover portion 130 to flex outwardly from the container portion 110 about the flexure axis 142 so that the cover portion 130 disengages from the container portion 110. In various embodiments, this may increase opening success for packaging assemblies with dimensional variability. It should be noted that although one corresponding concave portion 151 is shown in the drawing, in other embodiments an opposing concave portion may be included so as to substantially align with the other of the opposing concave portions 135 when the cover portion 130 closes the opening 120 defined by the container portion 110.

Another exemplary embodiment of the present invention is shown in FIG. 5. This embodiment is similar to that described with respect to FIGS. 1-3, however in this embodiment, at least one notch portion 153 is defined by the first flange portion 119. The notch portion 153 is configured to allow a disengaging device to exert an opening force against the second flange 132 through the notch portion 153. In such a manner, the disengaging device may alone to create the opening force, or may further facilitate disengaging the cover portion 130 from the container portion 110. In various embodiments, a disengaging device may be any device, tool, and/or mechanism configured to exert a force through the notch portion 153 against the second flange 132. The disengaging device may comprise, but is not limited to, a pneumatically operated pin. It should be noted that in some embodiments, a disengaging device may be responsible for facilitating disengaging the cover portion 130 from the container portion 110 without the use of an opening device. As such, in various embodiments a disengaging device may be used alone, or in combination with one or more opening tools received in one or both of the pair of apertures defined by the opposing concave portions 135. As a result, in various embodiments, this may also increase opening success for packaging assemblies with dimensional variability. It should be noted that although the notch portion 153 shown in the depicted embodiment is generally rectangular in shape, one skilled in the art will recognize that a notch portion in accordance with the present invention may take many other shapes, including, but not limited to, a half circular shape, a half oval shape, a triangular shape, a circular shape, an oval shape, and combinations thereof.

FIG. 6 shows still another exemplary embodiment of the present invention. The depicted embodiment includes both a corresponding concave portion 151 and a notch portion 153 defined by the first flange portion 119. As described above, the corresponding concave portion 151 is configured such that when the cover portion 130 is engaged with the container portion 110, the corresponding concave portion 151 substantially aligns with one of the opposing concave portions 135 defined by the second flange portion 132. The notch portion 153 is configured to allow one or more disengaging devices to exert a force against the second flange 132 through the notch portion 153. In such a manner, an opening force such as, for example, compressive force 200 of the depicted embodiment, may thus initiate the disengagement of the reinforcing ridge portion 140 from the inner periphery of the opening 120 so that the cover portion 130 disengages from the container portion 110. Additionally, an opening tool may be received by an aperture defined by the concave portion 135 and the corresponding concave portion 151 for encouraging the cover portion 130 to flex outwardly from the container portion 110 about the flexure axis 142 (see generally FIG. 2a). Simultaneously, a disengaging device may exert a force against the second flange 132 through the notch portion 153, to further encourage disengagement of the cover portion 130 from the container portion 110. As a result, in various embodiments, this may further increase opening success for packaging assemblies with dimensional variability.

FIGS. 7 and 8 show another exemplary embodiment of the present invention. In the depicted embodiment, the package assembly 100 generally comprises a container portion 110 defining an opening 120 and including at least two opposite sides 112, 114, and a cover portion 130 configured to cooperate with the container portion 110 to selectively close the opening 120 defined by the container portion 110. The cover portion 130 comprises a reinforcing ridge portion 140 disposed proximate a perimeter of the cover portion 130 and configured to be capable of engaging an inner periphery of the opening 120, in an interference fit, so as to selectively close the opening 120, such that the cover portion 130 is not easily disengaged from the container portion 110 without the application of an opening force, as described herein. The reinforcing ridge portion 140 also defines flexure channels 145 and 146, which are located on opposite sides 133, 131 of the cover portion 130. Furthermore, the flexure channels 145, 146 may cooperate to define a flexure axis 142 extending substantially perpendicularly to the opposite sides 133, 131 of the cover portion 130 defining the flexure channels 145, 146 such that the flexure axis 142 is substantially parallel to the opposite sides 112, 114 of the container portion 110. As shown generally in FIGS. 7 and 8, the package assembly 100 of the depicted embodiment further comprises a hinge portion 150 operably engaged between an edge of the cover portion 130 and side 114 of the container portion 110 such that the cover portion 130 and the container portion 110 form a substantially unitary package assembly 100 even when the cover portion 130 (and the reinforcing ridge portion 140 extending therefrom) is disengaged from the inner periphery of the opening 120 defined in the container portion 110.

Furthermore, as shown generally in FIGS. 7 and 8, the package assembly 100 of the depicted embodiment also comprises a pair of complementary flange portions 119, 132 extending outward from an outer periphery of the opening 120 and the reinforcing ridge portion 140 of the cover portion 130, respectively, such that in the closed position, the first flange portion 119 is substantially adjacent and parallel to the second flange portion 132. In addition, the second flange portion 132 may define a concave portion 135 located substantially adjacent to flexure channel 145 and the first flange portion 119 may also define a corresponding concave portion 151. Accordingly, when the package assembly 100 is in a closed position, concave portions 135 and 151 may be substantially adjacent to each other and may form an aperture between the first and second flange portions 119, 132. The aperture formed by the concave portion 135 and corresponding concave portion 151 is configured to receive an opening tool that creates an opening force for encouraging the cover portion 130 and the container portion 110 to separate. As noted above, in various embodiments, an opening tool may be any implement configured to aid in encouraging package assembly portions to separate, such as, for example, a screwdriver, knife, or other narrow-bladed implement, etc.

In the depicted embodiment, flexure channel 145, defined in the reinforcing ridge portion 140 on one side 133 of the cover portion 130, has a different configuration than flexure channel 146, defined in the reinforcing ridge portion 140 on an opposite side 131 of the cover portion 130. In the depicted embodiment, flexure channel 145 has an open rectangular cross-sectional shape, and flexure channel 146 has a generally V-shaped cross-sectional shape. As noted above, according to other embodiments, the flexure channels 145, 146 may also define various other cross-sectional shapes that may be tailored to define a flexure axis 142 extending substantially perpendicularly to the opposing sides 131, 133 of the cover portion 130. For example, one or both of the flexure channels 145, 146 may, in some other embodiments, define cross-sectional shapes that may include, but are not limited to: an open rectangular shape; an open oval shape; an open circular shape; generally U-shaped; generally V-shaped; and combinations of such cross-sectional shapes. The shape of the cross-section of the flexure channels 145, 146 may thus be tailored to suit the material used to form the cover portion 130 and/or the reinforcing ridge portion 140 so as to define a distinct flexure axis 142 across a width of the cover portion 130 such that the cover portion flexes outwardly from the container portion 110 about the flexure axis 142 defined by the opposing flexure channels 145, 146.

Thus, when the package assembly 100 of the depicted embodiment is in a closed position, the cover portion 130 may be configured to flex outwardly from the container portion 110 about the flexure axis 142 upon the application of an opening force. In the depicted embodiment, the package assembly 100 is configured to receive an opening tool via the aperture defined by concave portion 135 and corresponding concave portion 151, which are configured to substantially align when the package assembly is in a closed position. In the depicted embodiment, upon insertion of the opening tool into the aperture, the opening tool exerts an opening force against at least one of the cover portion 130 or container portion 120. As such, the opening force initiates disengagement of the reinforcing ridge portion 140 from the inner periphery of the opening 120 so that the cover portion 130 disengages from the container portion 110. Thus, if the package assembly 100 of the depicted embodiment contains a particulate aliquot and is inverted, the cover portion 130 may drop away from the container portion 110 after the reinforcing ridge portion 240 has been disengaged from the inner periphery of the opening 110, thus releasing the particulate aliquot.

A notch portion 153 is defined by the first flange portion 119 of the depicted embodiment. The notch portion 153 is configured to allow a disengaging device to exert another opening force approximately normal to the second flange 132 through the notch portion 153. In such a manner, the disengaging device 133 may further facilitate disengaging the cover portion 130 from the container portion 110. In various embodiments, a disengaging device may be any device, tool, and/or mechanism configured to exert a force through the notch portion 153 against the second flange 132. As such, in various embodiments a disengaging device may be used alone, or in combination with an opening tool received in the aperture defined by the opposing concave portions 135, 151. As a result, in various embodiments, this may increase opening success for some package assemblies. It should be noted that although the notch portion 153 shown in the depicted embodiment is generally rectangular in shape, one skilled in the art will recognize that a notch portion in accordance with the present invention may take many other shapes, including, but not limited to, a half circular shape, a half oval shape, a triangular shape, a circular shape, an oval shape, and combinations thereof.

In various embodiments it may be advantageous to reduce or eliminate bulging of the cover portion when it is engaged with the container portion, especially those embodiments where small particles, such as small seeds, are contained in the package assembly. In such embodiments, the package assembly may include one or more stiffening features configured to maintain engagement between the cover portion and the container portion and/or to reduce bulging of the cover portion and container portion. For example, the package assembly 100 depicted in FIGS. 7 and 8 includes a pair of elongate stiffening ribs 155 disposed on the cover portion 130. Although other embodiments may include one or more stiffening features having a variety of configurations, in the depicted embodiment the stiffening ribs 155 are oriented parallel to each other and are positioned proximate and substantially perpendicular to the flexure axis 142. Because in some embodiments the cover portion 130 may be engaged through an interference fit with the container portion 110, including one or more stiffening features on the cover portion 130 may minimize or eliminate bulging of the cover portion 130 when the package assembly 100 is in a closed position (i.e., when the cover portion 130 is engaged with the container portion 110). In such a manner, in the depicted embodiment the stiffening ribs 155 may prevent a gap from forming between the cover portion 130 and the container portion 110 prior to disengaging the cover portion 130 from the container portion 110.

As described above, in some embodiments the package assembly 100 may be inverted such that the cover portion 130 may swing away from the container portion 110 after the reinforcing ridge portion 140 has been disengaged from the inner periphery of the opening 120 due to an opening force. As a result, the package assembly 100 may thus be used to release a plurality of particles that have been segregated and contained within the container portion 110 of the package assembly 100. In some embodiments, after the cover portion 130 has disengaged from the container portion 110, it may extend downward from the hinge portion 150 approximately perpendicular from the container portion 110. In some embodiments, in order to facilitate successful release of substantially all of the particles contained in the package assembly 100, the cover portion 130 may include a beveled cover portion end 157 (more clearly shown in FIG. 8) disposed along an inner surface of the reinforcing ridge portion 140 opposite the hinge 150 portion. Although in other embodiments a beveled cover portion end may have a variety of configurations, in the depicted embodiment the beveled cover portion end 157 is a planar surface that is positioned at an approximate forty-five (45) degree angle relative to the surface of the cover portion 130. In such a manner, particles may be prevented from hanging up on the inner surface of the reinforcing ridge portion 140 after being released.

As described generally above, according to some embodiments of the package assembly 100 of the present invention, the container portion 110, the cover portion 130, the reinforcing ridge 140, and the hinge portion 150 may be substantially integrally formed such that the package assembly may be configured as a substantially one-piece assembly. Various manufacturing processes may be used to generate such single-piece package assembly 100 embodiments. For example, integrally-formed package assemblies 100 may be formed using processes including, but not limited to: thermoforming; vacuum forming; blow molding; injection molding; casting; and combinations of such processes. In addition, and as generally described above, the various container portions 110, cover portions 130, and hinge portions 150 of the package assembly 100 may also, in some embodiments, be molded and/or formed separately and operably engaged in subsequent processes that may include, but are not limited to: joining processes involving the application of a heat source, adhesive application processes, and/or mechanical joining processes (such as, for example stapling).

According to some embodiments of package assembly 100 of the present invention, the various components (including the container portion 110, cover portion 130, reinforcing ridge portion 140, and hinge portion 150, for example) may be composed of one or more different material types. For example, the container portion 110 of the package assembly 100 may be formed of a somewhat flexible, resilient, and/or self-supporting material so as to be capable of responding to a compressive force 200 (exerted, for example, on opposing sides 112, 114 of the container portion 110) and deforming slightly so as to cause the cover portion 130 to flex outwardly about the flexure axis 142 (as shown in an exemplary side view of FIG. 2a). For example, the package assembly 100 may comprise a variety of different polymer compounds that may include, but are not limited to: polyester; polylactic acid (PLA); polypropylene; polyethylene terephthalate (PETE); polyvinyl chloride (PVC); high-density polyethylene (HDPE); low-density polyethylene (LDPE); and combinations of such materials.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A package assembly for selectively containing and releasing a particulate aliquot, the package assembly comprising:
first and second portions which cooperate to contain the aliquot, the first portion defining a pair of opposite sides and having a flexure channel defined in each of the opposite sides, wherein the flexure channels define a flexure axis extending through the flexure channels, and wherein the package assembly is configured such that upon application of an opening force to opposing sides of the second portion, the flexure axis moves away from the second portion and an end of the first portion separates from an end of the second portion, thus releasing the particulate aliquot,
wherein the first and second portions define first and second flange portions, respectively, and wherein the package assembly further comprises a notch portion located on one of the first or second flange portions, the notch portion configured to allow a disengaging tool to apply a substantially normal force against the other of the first or second flanges, for encouraging the first and second portions to separate.

2. The package assembly according to claim 1, further comprising at least one concave portion located on a flange portion defined by at least one of the first or second portions, the concave portion defining an aperture configured to receive an opening tool for encouraging the first and second portions to separate.

3. The package assembly according to claim 2, further comprising at least one corresponding concave portion located on a second flange portion of the package assembly and adapted, upon closing the package assembly, to substantially align with the other concave portion to define an aperture configured to receive an opening tool for encouraging the first and second portions to separate.

4. The package assembly according to claim 1, wherein the first and second portions are held together in a closed position through an interference fit.

5. The package assembly according to claim 1, wherein each of the flexure channels defines a cross-sectional shape selected from the group consisting of:
an open rectangular shape;
an open oval shape;
a half-circular shape;
generally U-shaped;
generally V-shaped; and
combinations thereof.

6. The package assembly according to claim 5, wherein one flexure channel defines a cross-sectional shape that is different than the other flexure channel.

7. The package assembly according to claim 1, wherein the package assembly is formed using a process selected from the group consisting of:
thermoforming;
vacuum forming;
blow molding;
injection molding;
casting; and
combinations thereof.

8. The package assembly according to claim 1, wherein the package assembly comprises materials selected from the group consisting of:
polyethylene terephthalate;
polyvinyl chloride;
polypropylene;
polyester;
polylactic acid;
high-density polyethylene;
low-density polyethylene; and
combinations thereof.

9. The package assembly according to claim 1, further comprising one or more stiffening features located on at least one of the first and second portions, the stiffening features configured to minimize bulging between the first and second portions or to maintain engagement of the first and second portions.

10. A package assembly for selectively containing and releasing a particulate aliquot, the package assembly comprising:
- a container portion defining an opening;
- a cover portion comprising at least two opposite sides and configured to cooperate with the container portion to selectively close the opening defined by the container portion;
- a reinforcing ridge portion disposed proximate a perimeter of the cover portion and configured to be capable of engaging an inner periphery of the opening, in an interference fit therewith, so as to selectively close the opening, the reinforcing ridge portion defining a flexure channel on each of the opposite sides of the cover portion, the flexure channels defining a flexure axis extending substantially perpendicularly to the opposite sides of the cover portion, the cover portion being configured such that when an opening force is applied to opposing sides of the container portion, the flexure axis moves away from the container portion and thereby disengages a portion of the reinforcing ridge portion from the inner periphery of the opening, thus releasing the particulate aliquot; and
- a shelf portion comprising a flange extending substantially perpendicular from an outer periphery of the opening of the container portion and a wall portion extending substantially perpendicular from the flange, wherein the reinforcing ridge is configured to operably engage the shelf portion so as to selectively close the opening defined by the container portion.

11. The package assembly according the claim 10, further comprising a hinge portion located between an edge of the cover portion and the container portion.

12. The package assembly according to claim 11, wherein the container portion, the cover portion, the reinforcing ridge portion, and the hinge portion are integrally formed as a substantially unitary assembly.

13. The package assembly according to claim 11, further comprising a beveled cover portion end disposed along an inner surface of the reinforcing ridge portion opposite the hinge portion.

14. The package assembly according to claim 10, further comprising:
- a first flange portion extending substantially perpendicular from an outer periphery of the opening; and
- a second flange portion extending substantially outward from the reinforcing ridge such that upon closing the package assembly, the cover portion closes the opening defined by the container portion and the first flange portion is substantially adjacent and parallel to the second flange portion.

15. The package assembly according to claim 14, wherein the first and second flange portions each define concave portions such that upon closing the package assembly the concave portions substantially align and define an aperture between the first and second flange portions, the aperture being configured to receive an opening tool for encouraging the cover portion to flex outwardly from the container portion about the flexure axis so that the cover portion disengages from the container portion.

16. The package assembly according to claim 15, further comprising at least one notch portion defined by the first flange portion, the at least one notch portion being adapted to allow a portion of a disengaging tool to pass therethrough for encouraging the cover portion to disengage from the container portion.

17. The package assembly according to claim 10, wherein at least one of the flexure channels defines a cross-sectional shape selected from the group consisting of:
- an open rectangular shape;
- an open oval shape;
- a half-circular shape;
- generally U-shaped;
- generally V-shaped; and
- combinations thereof.

18. The package assembly according to claim 17, wherein a first flexure channel defines an open rectangular cross-sectional shape and a second flexure channel defines a generally V-shaped cross-sectional shape.

19. The package assembly according to claim 10, wherein the container portion, the cover portion, the reinforcing ridge portion, and the opening defined by the container portion are substantially rectangular.

20. The package assembly according to claim 10, further comprising one or more stiffening features located on the cover portion, the stiffening features configured to minimize bulging between the cover and container portions or to maintain engagement of the cover and container portions.

21. The package assembly according to claim 20, wherein the stiffening features comprise a pair of elongate stiffening ribs disposed on the cover portion.

22. A package assembly for selectively containing and releasing a particulate aliquot, the package assembly comprising:
- first and second portions which cooperate to contain the aliquot, the first portion defining a pair of opposite sides and having a flexure channel defined in each of the opposite sides, wherein the flexure channels define a flexure axis extending through the flexure channels, and wherein the package assembly is configured such that upon application of an opening force to opposing sides of the second portion, the flexure axis moves away from the second portion and an end of the first portion separates from an end of the second portion, thus releasing the particulate aliquot;
- at least one concave portion located on a flange portion defined by the first portion of the package assembly; and
- at least one corresponding concave portion located on a flange portion defined by the second portion of the package assembly, wherein the at least one corresponding concave portion is adapted, upon closing the package assembly, to substantially align with the other concave portion to define an aperture configured to receive an opening tool for encouraging the first and second portions to separate.

23. A package assembly for selectively containing and releasing a particulate aliquot, the package assembly comprising:
- a container portion defining an opening;
- a cover portion comprising at least two opposite sides and configured to cooperate with the container portion to selectively close the opening defined by the container portion;
- a reinforcing ridge portion disposed proximate a perimeter of the cover portion and configured to be capable of engaging an inner periphery of the opening, in an interference fit therewith, so as to selectively close the opening, the reinforcing ridge portion defining a flexure channel on each of the opposite sides of the cover portion, the flexure channels defining a flexure axis extending substantially perpendicularly to the opposite sides of the cover portion, the cover portion being configured such that when an opening force is applied to opposing sides of the container portion, the flexure axis moves away from the container portion and thereby disengages a portion of the reinforcing ridge portion from the inner periphery of the opening, thus releasing the particulate aliquot;
a first flange portion extending substantially perpendicular from an outer periphery of the opening; and
a second flange portion extending substantially outward from the reinforcing ridge such that upon closing the package assembly, the cover portion closes the opening defined by the container portion and the first flange portion is substantially adjacent and parallel to the second flange portion.

\* \* \* \* \*